United States Patent
Evans et al.

(10) Patent No.: US 6,374,609 B1
(45) Date of Patent: Apr. 23, 2002

(54) GAS GENERATOR HOUSING

(75) Inventors: Raymond George Evans, Fareham; Shaun Peter Ruddick, Carlisle, both of (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/180,640

(22) PCT Filed: May 16, 1997

(86) PCT No.: PCT/GB97/01338

§ 371 Date: Aug. 16, 1999

§ 102(e) Date: Aug. 16, 1999

(87) PCT Pub. No.: WO97/43148

PCT Pub. Date: Nov. 20, 1997

(30) Foreign Application Priority Data

May 16, 1996 (GB) .............................................. 9610210

(51) Int. Cl.[7] ................................................ F15B 21/12
(52) U.S. Cl. ......................... 60/532; 102/531; 280/806; 297/480
(58) Field of Search ........................... 60/532; 102/531; 297/480; 280/806, 741

(56) References Cited

U.S. PATENT DOCUMENTS

| | | | | | |
|---|---|---|---|---|---|
| 2,191,676 | A | * | 2/1940 | Nardone | 102/531 |
| 5,492,065 | A | * | 2/1996 | Jena et al. | 102/531 |
| 5,564,747 | A | * | 10/1996 | Ono et al. | 280/806 |

* cited by examiner

Primary Examiner—F. Daniel Lopez
(74) Attorney, Agent, or Firm—Markell Seitzman

(57) ABSTRACT

A housing (2) for mounting a gas generatot (7) in a pyrotechnic pretensioner, the housing comprising a hollow container for supporting the gas generator, the container having an opening through which the gas generator (7) may be inserted and having a tapered end section (20) arranged to be adjacent and to co-operate with a gas outlet end of the gas generator to provide a seal around the gas outlet, and the hpusing having a cover (8) for closing the container opening, the cover having a tapered wedge member (22) extending into the container in use at the opposite end to the tapered end section (20) to urge the gas generator (7) towards the tapered end section (20) of the container, in a close fit manner. The wedge(22) is preferably integral with the housing cover (8). This housing makes fitting of the gas generator easier and improves the seal between it and the pretensioner thus improving performance.

3 Claims, 3 Drawing Sheets

GAS GENERATOR HOUSING

DESCRIPTION

The present invention relates to a housing for a gas generator and particularly to a housing for a gas generator used in a pyrotechnic pretensioner for a vehicle safety restraint system.

Such pretensioners are detonated in the event of rapid deceleration of a vehicle, indicative of a crash, and operate to tighten a safety belt around an occupant of the vehicle to more securely restrain the occupant against inertial movement and also to correctly position the occupant for effective deployment of an air bag. The belt is tightened either at the retractor end or at the buckle end so as to take up slack in the system which may be caused by thick clothing worn by the occupant or by the occupant being out of position. Typically 150–180 mm of slack in the belt is taken up by a pretensioner.

Typically a pyrotechnic pretensioner uses a gas generator, detonated when a crash situation is detected, to release pressurised gas to drive a piston along a tube. The piston may be connected by a cable or other such mechanism to a belt buckle fastening point, eg the so-called buckle stalk to pull back the buckle end of the belt. Alternatively it may be connected to the belt retractor to rewind the retractor spool. A clutch connection is typically used here.

In either case the pretensioner generally comprises an elongate cylindrical tube and is typically a rather large and unwieldy item, somewhat difficult to conceal in a vehicle. Traditionally it is mounted under a vehicle seat. The gas generator may be fitted in a separate housing connected to the pretensioner tube pneumatically but a more compact and efficient system is produced if the gas generator housing is integral with the tube, for example mounted coaxially herewith.

For safety reasons it is preferable to fit the actual gas generator as a last operation when the pretensioner is already installed in the vehicle so as to minimise dangers from premature or accidental detonation of the device. In known pretensioners it is difficult to do this while guaranteeing a good seal between the housing and the generator. Also some disassembly of the system, for example of the bracket holding the buckle head is necessary and this is time consuming and hence costly.

The present invention provides a housing for a gas generator comprising a hollow container for supporting a gas generator, the container having a opening for insertion of the gas generator and a tapered end section for cooperating with a gas outlet end of the gas generator to provide a seal around the gas outlet and a cover for closing the container opening, the cover having a tapered wedge portion extending into the container in use to urge the gas generator towards the tapered end of the container.

Preferably the wedge member is integral with the cover for the housing and extends generally perpendicularly thereto.

In a preferred embodiment the cover is provided with extensions overlapping the housing which extensions have means for locking the cover onto the housing.

The locking means may comprise apertures corresponding to apertures on the housing through which roll pins can be inserted to hold the cover to the housing.

For a better understanding of the invention and to show how the same may be carried into effect, reference will now be made to the accompanying drawings in which.

Figure 1:
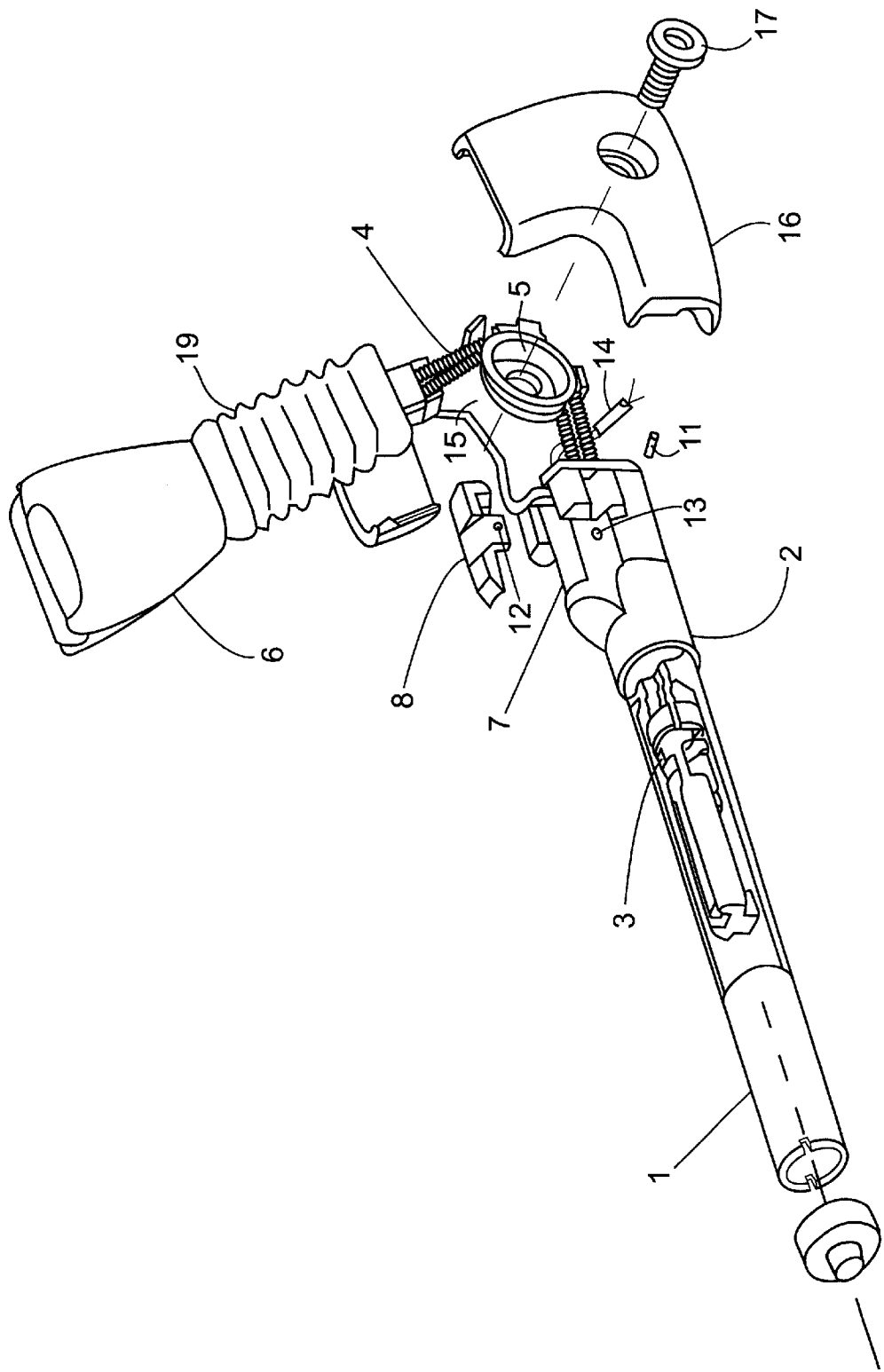
FIG. 1 is a perspective part cut-away and part exploded view of a buckle pretensioner embodying the gas generator housing according to the invention.

The pretensioner of FIG. 1 comprises a cylindrical elongate pressure tube 1 in which is slidably supported a piston 3. Piston 3 is attached to a buckle head 6 via cable 4 which is guided round a circular mounting bracket 5 and supports buckle head 6 in its normal position of use, ie adjacent a vehicle seat at a convenient elevation within reach of the occupant.

In order to provide the supporting strength, the cable 4 is usually a double length of cable, as shown.

Mounted on the pressure tube 1 at its end close to the mounting bracket S is a gas generator housing 2 with an opening facing away from the surface of tube 1 for insertion of a gas generator 7. A cover 8 for this opening forms a safety plate for the gas generator 7 and is locked to the housing 2 by two oppositely located lock pins 11 (only one of which is shown in FIG. 1) which locate in corresponding apertures 12 and 13 in the cover 8 and housing 2 respectively. The construction of this cover will be explained in more detail with reference to FIG. 2 and 3.

Wires 14 extend from the gas generator 7 through the back of the housing 2 and are used for detonating the generator to release gas in the event of a crash. The appropriate sensor and igniter are not shown but are of standard construction, well known in the art. The circular part 5 of mounting bracket 15 is covered by a plastic sleeve 16 which is fixed in place by a nut or bolt 17 which is also used to mount the arrangement in a vehicle, for example to a structural part or to a seat.

The buckle supporting stalk formed by double cable 4 is also covered by a convoluted plastic sleeve 19 which is shaped so as to concertina and retract in overall length as the buckle head 6 is pulled down when the pretensioner operates.

Figure 2:
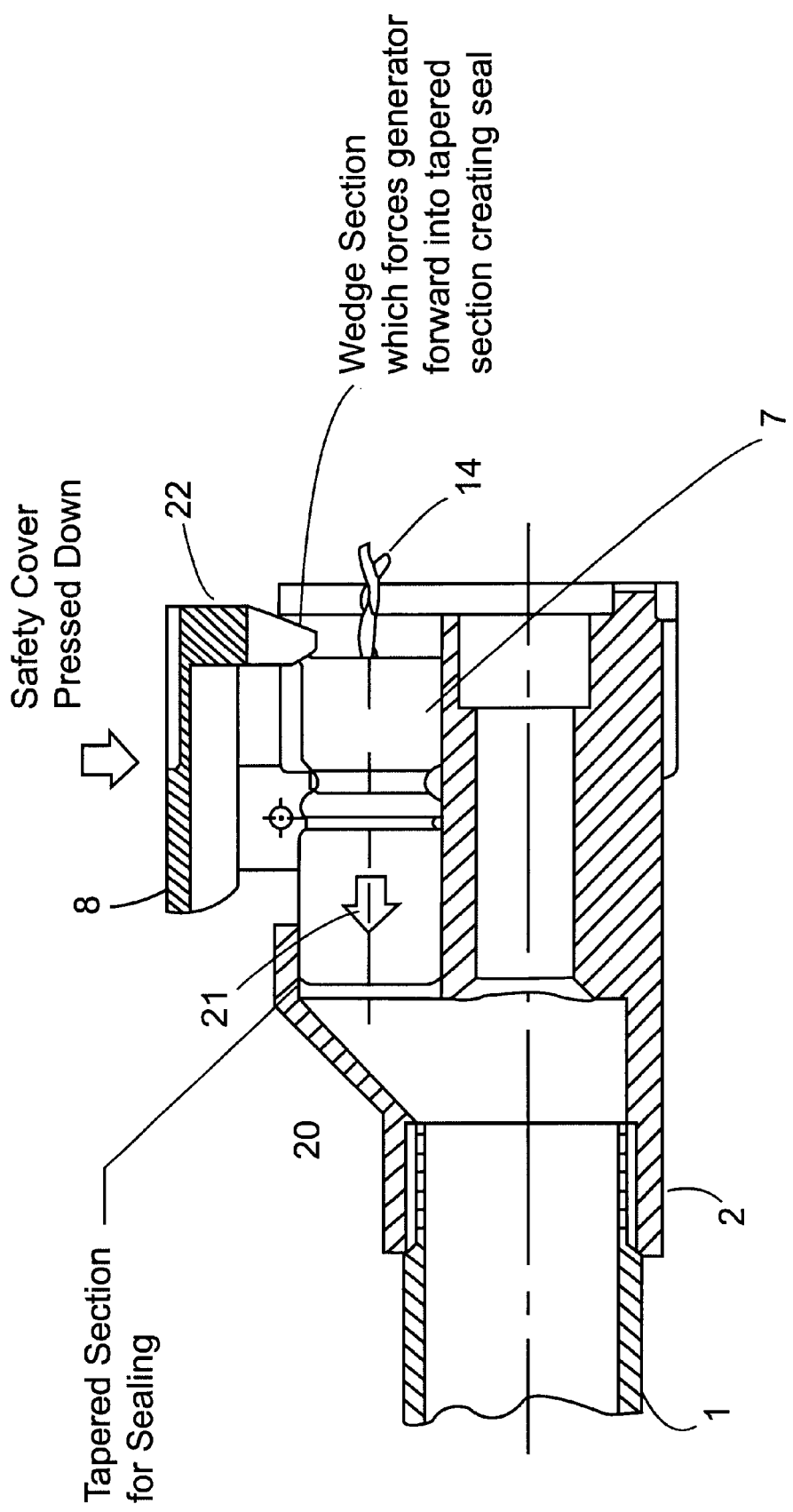
FIG. 2 is a longitudinal cross section of part of FIG. 1 showing the gas generator and its housing according to the invention with the housing cover being put in place on the housing.

FIG. 2 shows the gas generator 7 supported within the housing 2 mounted on the cylindrical tube 1. The housing 2 is tapered at one end 20 corresponding to the end of the gas generator wherein is located the gas outlet. The arrow 21 indicates the direction of gas flow when the gas generator is activated. The wires 14 at the opposite end of the gas generator 7 carry an electrical detonation signal to the generator from a crash sensor and indicator of known construction (not shown).

The cover 8 for housing 7 comprises a safety plate part of curved shape to match the shape of the housing 7 and extending perpendicularly thereto, a wedge section 22 which tapers away from the safety plate and is adapted to fit between the back of the gas generator 7 and the adjacent housing wall.

Figure 3:
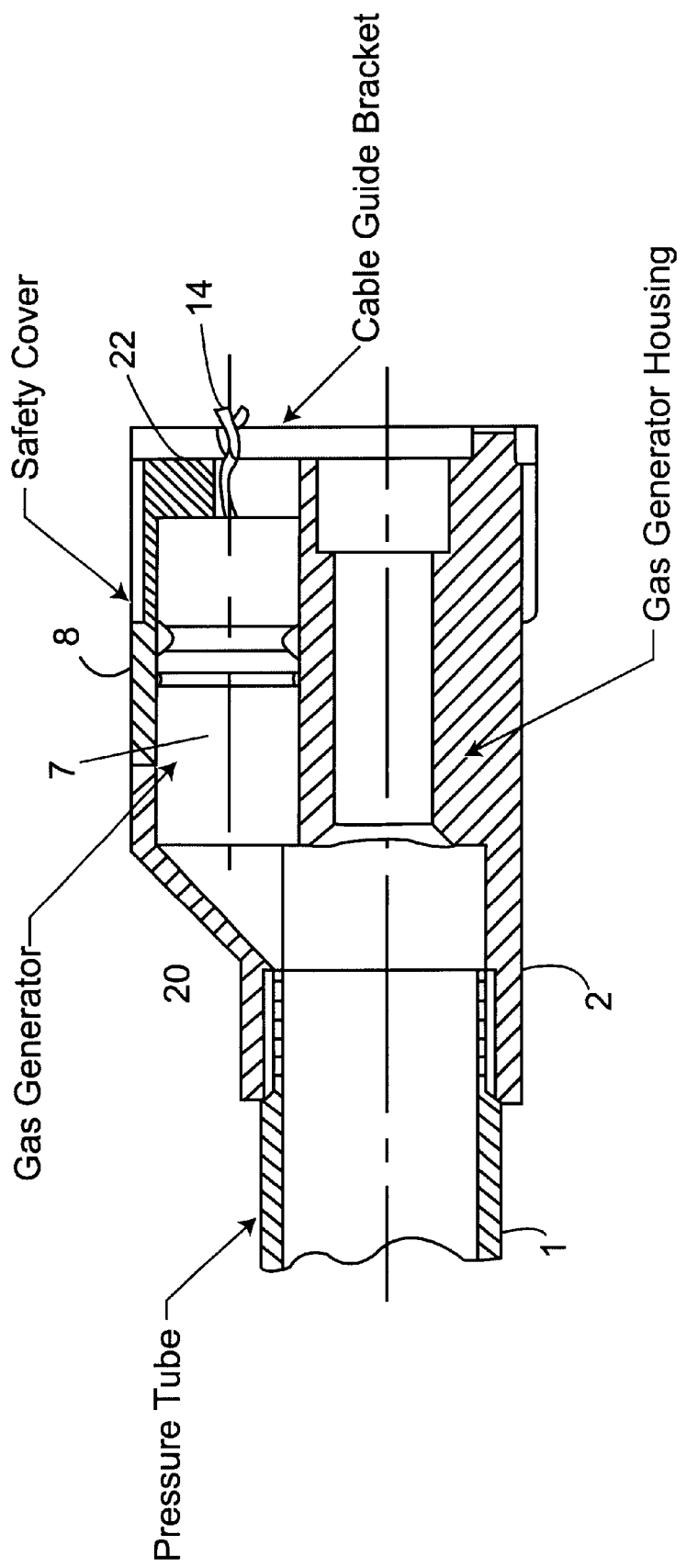
FIG. 3 is the same view as FIG. 2 but with the housing cover in place.

In FIG. 3 like parts are identified by like reference numerals and the housing cover 8 is shown in its fully inserted position closing the housing 7.

From FIGS. 2 and 3 it will be clear that as the cover 8 is inserted onto the housing, the wedge pushes down between the gas generator and the rear housing wall and urges the generator into the tapering section of the housing 7 so as to provide an interference fit between the generator and the housing and an effective seal around the generator gas outlet. When fully inserted the cover holds the gas generator securely in the housing.

It is easy with such a arrangement to fit the gas generator as a last step operation after the pretensioner is secured in the vehicle. No dismounting of parts is necessary. The invention thus provides for a pretensioner to be constructed which overcomes problems of the prior known arrangements.

What is claimed is:

1. A housing for mounting a gas generator in a pyrotechnic pretensioner, the housing comprising a hollow container for supporting the gas generator, the container having an opening through which the gas generator is inserted and the housing having a cover for closing the container opening;

wherein the cover comprises at least one extension overlapping with the housing, the at least one extension having means for locking the cover onto the housing;

wherein the locking means comprises apertures corresponding to apertures on the housing to receive roll pins to hold the cover to the housing.

2. A housing for mounting a gas generator in a pyrotechnic pretensioner, the housing comprising a hollow container for supporting the gas generator, the container having an opening through which the gas generator is inserted and hating a tapered end section arranged to be adjacent and to cooperate with a gas outlet end of the gas generator to provide a seal around the gas outlet, and the housing having a cover for closing the container opening, the cover having a tapered wedge member extending into the container in use at the opposite end to the tapered end section to urge the gas generator towards the tapered end section of the container, in a close fit manner;

wherein the wedge member is integral with the cover for the housing and extends generally perpendicularly thereto;

wherein the cover comprises at least one extension overlapping with the housing, the at least one extension having means for locking the cover onto the housing; and wherein the locking means comprises apertures corresponding to apertures on the housing to receive roll pins to hold the cover to the housing.

3. A housing for mounting a gas generator, the housing comprising a hollow container generally aligned with a longitudinal axis thereof, for supporting the gas generator, the container having an elongated opening in an outer wall thereof, the opening spaced from, yet parallel to the longitudinal axis, through which an elongated gas generator is sideways inserted, the gas generator and housing cooperating to affect a seal proximate a gas outlet of the gas generator and passage of the housing and the housing having a cover for closing the elongated opening.

* * * * *